United States Patent [19]

Atherton

[11] Patent Number: 4,598,322

[45] Date of Patent: Jul. 1, 1986

[54] VIDEO LEVEL CONTROL FOR CCD CAMERA

[75] Inventor: Larry S. Atherton, Anoka, Minn.

[73] Assignee: Honeywell Inc., Minneapolis, Minn.

[21] Appl. No.: 733,544

[22] Filed: May 13, 1985

[51] Int. Cl.$^4$ ............................................. H01J 40/14
[52] U.S. Cl. ................................... 358/213; 358/211; 358/228
[58] Field of Search ............... 358/212, 213, 228, 174, 358/211

[56] References Cited

U.S. PATENT DOCUMENTS

| | | | |
|---|---|---|---|
| 3,934,161 | 1/1976 | Caywood | 358/213 |
| 4,202,014 | 5/1980 | Gilligan et al. | 358/228 |
| 4,300,167 | 11/1981 | Miller et al. | 358/228 |
| 4,327,378 | 4/1982 | Tanaka et al. | 358/228 |
| 4,365,272 | 12/1982 | Nagai | 358/228 |
| 4,388,526 | 6/1983 | Schroeder | 358/213 |
| 4,399,464 | 8/1983 | Hix et al. | 358/213 |
| 4,472,743 | 9/1984 | Ogasawara | 358/228 |
| 4,485,405 | 11/1984 | Bailey | 358/213 |
| 4,489,350 | 12/1984 | Kimura | 358/213 |
| 4,499,497 | 2/1985 | Levine | 358/213 |
| 4,504,866 | 3/1985 | Saito | 358/213 |
| 4,516,172 | 5/1985 | Miyata | 358/213 |
| 4,544,848 | 10/1985 | Kawasaki | 358/213 |
| 4,563,708 | 1/1986 | Ishibashi | 358/213 |

Primary Examiner—Gene Z. Rubinson
Assistant Examiner—L. C. Schroeder
Attorney, Agent, or Firm—Charles G. Mersereau

[57] ABSTRACT

An automatic light level control system for a video camera is disclosed which uses a time-variable camera clock for determining and controlling the scanning rate of the camera. A control means responsive to the light level of the video output of the camera controls the rate of the camera clock, and thereby the scan rate of the camera so that the light level of the video output is maintained within desired limits.

12 Claims, 2 Drawing Figures

VIDEO LEVEL CONTROL FOR CCD CAMERA

BACKGROUND OF THE INVENTION

1. Field of the Invention

The present invention relates to the field of video level control and, more particularly, to a system which automatically monitors and adjusts the video level for a solid-state video camera using a charge-coupled imaging device (CCD).

2. Description of the Prior Art

One of the problems associated with the use of any television or video camera equipment, especially that using CCD imaging devices, is that of controlling the level of video output signal in response to changes in the light level entering the camera lens system. The video output level of the camera must be kept within an acceptable range in order that that quality of the video images produced may be maintained. Of course, the problem is especially acute in situations where the light level cannot be controlled.

There have been several approaches to controlling the video output level for such devices. In one approach the amount of light transmitted through the TV camera lens is controlled by mechanically varying the iris opening of the lens in response to changes in the environmental light level sensed by the system. These normally consist of servo motors and motor controls which are used to drive the iris toward an open or shut position in response to variation in the sensed input light level. The control may be separate or may be in the form of an override control which overrides the normal iris control system which operates in response to image contrast level. In another system approach, a high speed shutter which may be driven by a pulsed width modulator is utilized to vary the average length of time to which the photo-sensitive devices of the camera are exposed to the incoming light during the composition of the frame. This, of course, also requires a mechanical shuttering device with associated drive circuitry and mechanism.

An additional approach which has been used in an effort to control the camera output is accomplished through an adjustable gain control system within the camera signal processing system. This may be in the form of an automatic gain selecting unit which selects one of several gain ranges in response to the lens-iris setting of the camera device or it may be an intermittent system which averages the total intensity of the final image.

While the above devices have been somewhat successful, all suffer from certain undesirable drawbacks. The mechanical lens and shutter operating systems require complicated electro-mechanical servo systems and are subject to all the limitations of mechanically operated devices. The automatic gain control devices eliminate the problems associated with mechanical iris or shutter operation. However, these systems introduce problems such as image distortion associated with wide-ranging variation in the signal gain characteristics.

SUMMARY OF THE INVENTION

In accordance with the present invention, the problems associated with prior art electro-mechanical iris and shutter control devices and those associated with automatic gain control systems are solved by the provision of an automatic television camera video level control system which achieves accurate video level control by controlling the scan frequency of the camera in response to the monitored on-going video level. This eliminates the need for electro-mechanical servo systems to modulate iris or shutter operation and avoids the distortion problems associated with wide range gain controllers.

The preferred embodiment has a sampling system which samples the video signal output of the CCD camera at a controlled rate based on the scanning rate and amplifies the sampled video signal to produce sample output signal in the form of an analog DC signal based on the peak level of a scan line. A comparator system is provided which compares the level of the video sample signal with predetermined high and low level threshold signals. A camera scan frequency modulation system including a voltage controlled oscillator (VCO) or the like is provided which frequency controlled the output of the signal level comparator system. Whenever the sample level falls outside the defined desired operating range, the frequency of the VCO is correspondingly modulated. The VCO frequency output controls the video camera clock which, in turn, operates to modulate the scan frequency of the camera.

By varying the scan frequency of the camera the average exposure time of the electromagnetic radiation-sensitive elements of the array or equivalent sensor system is varied in a controlled manner such that the signal level is maintained in the desired range. Thus, if the comparator system indicates that the level of the video signal is above the high level threshold, the VCO of the camera scan frequency modulation system operates to increase the camera scan frequency thereby decreasing the average exposure time of the CCD array, or equivalent, and, in turn, decreasing the level of the output video signal. Conversely, if the comparator system indicates that the level of the video signal is below the low level threshold value, the VCO of the camera scan frequency modulation system operates to decrease the camera scan frequency thereby increasing the average exposure time which increases the level of the output video signal. If the comparator system indicates that the video signal level is within the acceptable range, no modulation of the scan frequency occurs.

The invention, thus, permits very rapid control of the video output signal level by purely electronic means within the signal generating system without the need for any mechanical devices or any electronic device which may cause image distortion. This represents a decided advantage in both system reliability and system simplicity.

DESCRIPTION OF THE PREFERRED EMBODIMENT

Figure 1:
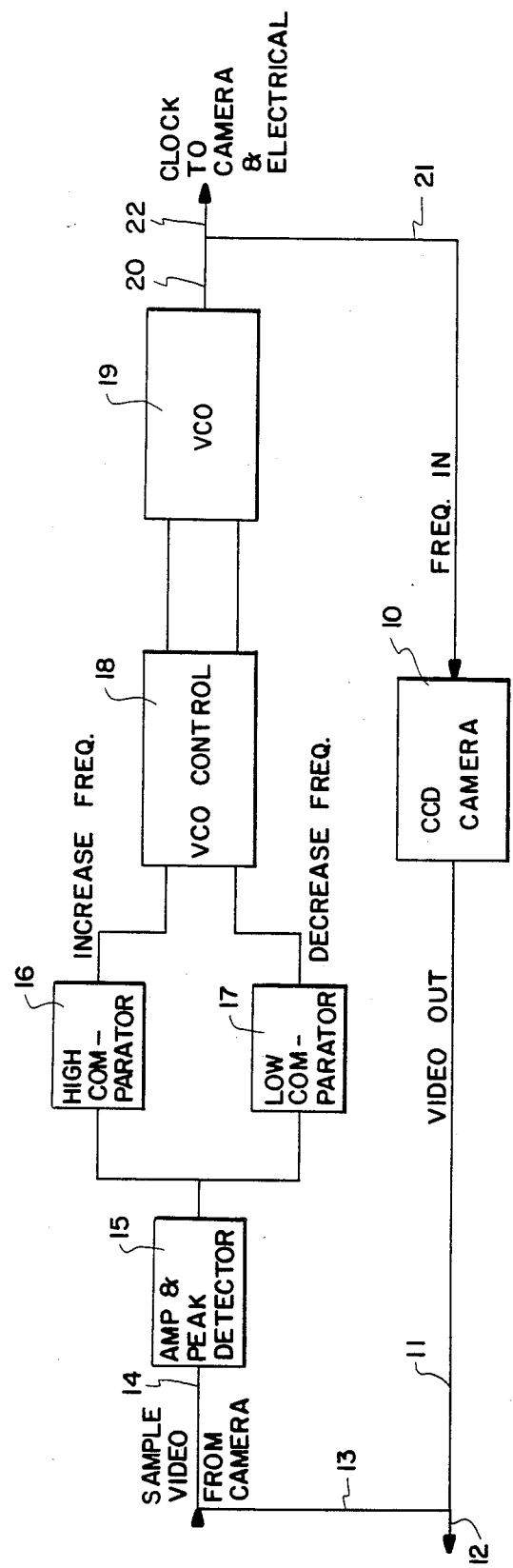
FIG. 1 is a block diagram of the video level control system of the invention.

FIG. 1 illustrates the video level control system of the present invention in block form. The system is shown including a CCD camera 10 which may operate to receive electromagnetic radiation input as by a diode array (not shown) or other conventional photo sensitive means. The CCD camera produces an output signal which is conducted along path 11, 12 to any desired signal utilization means and is sampled by the control system of the invention via path 11, 13, 14. The system further includes a signal amplification and peak detection means 15, high level comparator 16, low level comparator 17, voltage controlled oscillator (VCO) 18 and a VCO control system 19. The VCO output signal is fed to the camera via path 20, 21 to control the camera clock and also to control the sampling cycle via path 20, 22.

Figure 2:
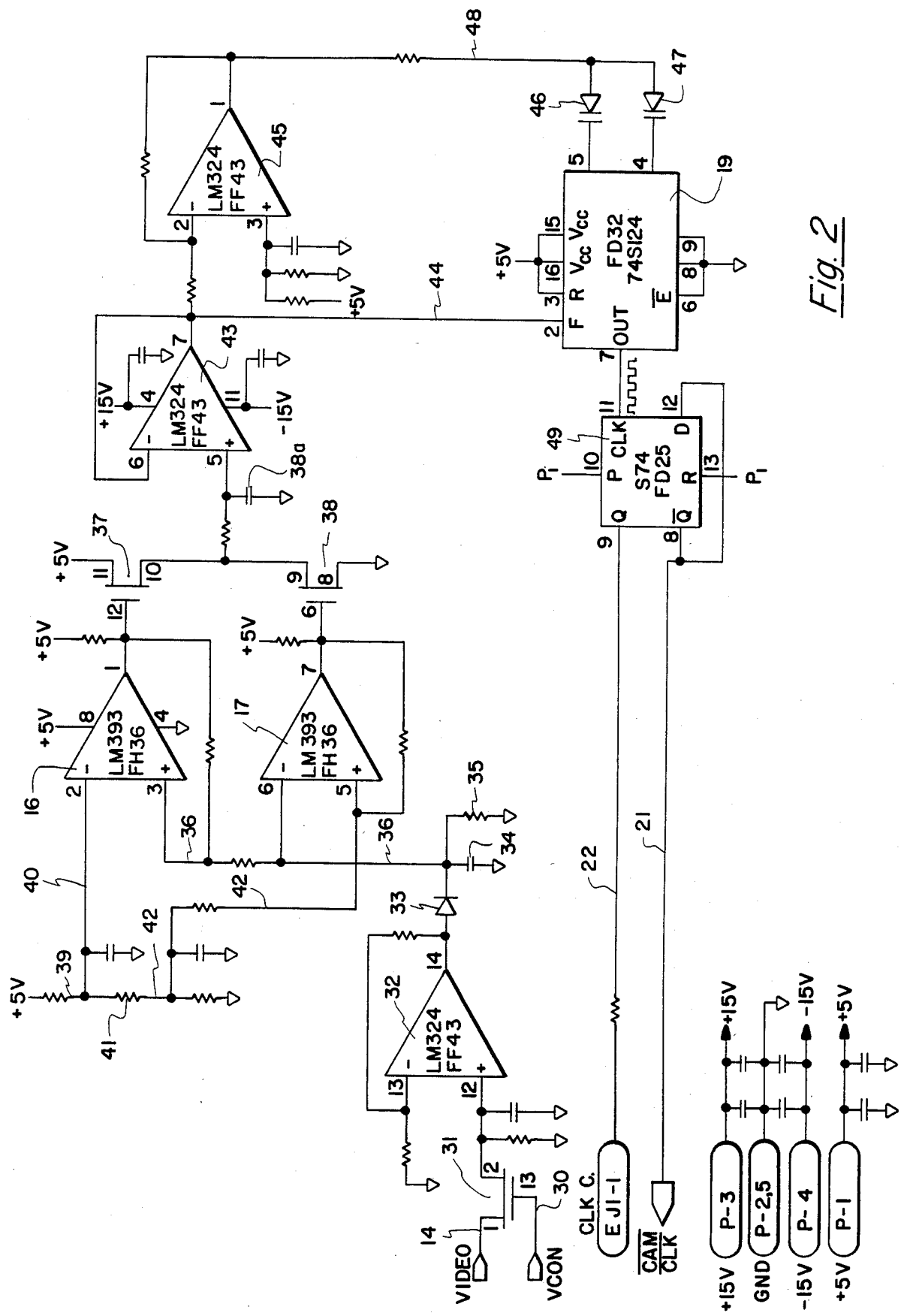
FIG. 2 is a more detailed schematic of the control system of FIG. 1.

The system is shown in greater detail in FIG. 2. The input of the sample video level signal on line 14 is controlled by a video sample control signal on conductor 30 which opens an analog gate 31 which may be a field effect transistor (FET) during the active data period of each scan line. The signal is processed by an operational amplifier 32. Diode 33 along with capacitor 34 and resistor 35 produce an analog DC signal representative of the then-current peak CCD camera video output level. The diode 33 together with capacitor 34 and resistor 35 at the amplifier output detects and holds the peak level of the sample signal in order that the peak value be compared with the desired video level range. This DC analog level signal is fed to the signal comparison system via conductor 36.

The comparison system consists of dual high and low level comparators 16 and 17 along with respective FETs 37 and 38. A stabilizing capacitor 38a is also provided. Reference signals are also provided as the high and low threshold values. The high level threshold signal is provided to the negative input of comparator 16 via route 39, 40 and the low level threshold is provided to the positive input pin of comparator 17 reduced by an additional resistor 41 via conductor 42. The analog video sample signal then becomes the positive input to high threshold comparator 16 and the negative input to low threshold comparator 17.

The VCO control system includes operational amplifier 43 which acts as a buffer amplifier and supplies a VCO control voltage to the VCO 19 via conductor 44. This voltage is also inverted and amplified by amplifier 45 to control tuning diodes 46 and 47 via conductor 48. As the input from conductor 48 increases, i.e. has a larger negative value, the potential across tuning diodes 46 and 47 increases and the tuned frequency increases. This occurs when a relatively high potential exists on conductor 44. Conversely, as the value of the input potential drops in magnitude the potential across diodes 46 and 47 decreases and the tuned frequency decreases.

The VCO 19 generates a digital square wave output of controlled frequency at pin 7 which, in turn, is fed to the clock input of a frequency divider 49. The frequency divider 49 divides the received input frequency by 2 and produces a Q output which is passed via conductor 21 to control the scanning clock of the CCD camera 10. The Q output control signal is fed, inter alia, via conductors 22 and 30 to control the input through analog gate 31.

In operation, the peak level output on line 36 for each scan line of the CCD camera 10 is compared to the low level and high level thresholds by comparators 16 and 17. If the peak video level is above the high level threshold the analog gate (FET 37) is turned on via pin 1 of comparator 16. This in turn, increases the voltage at pins 5 and 7 of operational amplifier 43. As the voltage at pin 7 of operational amplifier 43 increases the voltage on conductor 44 and the value (negative) of the voltage on conductor 48 also increases. This condition provides inputs through pins 2, 4 and 5 of VCO 19 which cause the VCO output frequency to increase. This, in turn, increases the camera clock frequency to increase the camera scan frequency and thereby decrease the video output signal level as the sensitive camera elements are given less exposure or charge time.

Conversely, if the peak voltage level is below the low voltage threshold, the analog gate 37 is turned on as this accesses the output of pin 7 of comparator 17 to go high. This, in turn, decreases or lowers the voltage at pins 5 and 7 of operational amplifier 43. As the voltage at pin 7 of the operational amplifier 43 decreases the corresponding potential in conductor 44 and the value (negative) of the voltage on conductor 48 also decrease. Under these conditions, the input through pins 2, 4 and 5 to VCO 19 cause the output frequency to decrease. This decreases the camera clock frequency and thereby increases the video output signal level as the camera elements are given a longer exposure time.

Of course, when the system is operating within the prescribed high/low threshold limits both pin 1 of comparator 16 and pin 7 of comparator 17 remain low and no frequency change is indicated by the control system. The control voltage is maintained at the same level by capacitor 38a (FIG. 2) when no change is indicated.

The embodiments of the invention in which an exclusive property or right is claimed are defined as follows:

1. An automatic light level control system for a video camera comprising a frequency-variable camera clock means associated therewith for determining and controlling the scanning rate of said camera, and a control means connected to the video output of said camera and responsive to the level of the video output signal of said camera for controlling the rate of said camera clock means and thereby the scan rate of said camera such that the level of the video output signal is maintained within desired limits.

2. The apparatus of claim 1 wherein said control means further comprises:
   oscillator means having an output for controlling the rate of said camera clock;
   sampling means having an input connected to sample the video output signal of said camera and having an output signal indicative of the level of the video output;
   comparator means connected to the output of said sampling means for comparing the level of the output signal of said sampling means with high and low threshold values;
   frequency control means for controlling the frequency of said oscillator means connected between said oscillator means and said comparator means.

3. The apparatus of claim 2 wherein said sampling means further comprises:
   control means for controlling the interval rate at which said video signal is sampled;
   amplifier means to amplify the input signal to said sampling means;
   peak detector means to detect and hold the peak value of said sampled signal during each sampling interval; and
   output means for transmitting a signal indicative of said peak value of said sampled signal to said comparator means.

4. The apparatus of claim 2 wherein said comparator means further comprises:
   a high level comparator having a threshold input indicative of the highest desired video signal level, a sample input connected to the output of said sampling means and wherein said high level comparator produces a control output when said sample input exceeds the threshold value;

a low-level comparator having a threshold input indicative of the lowest desired video signal level, a sample input connected to the output of said sampling means and wherein said low level comparator produces a control output when said sample input falls below said threshold input.

5. The apparatus of claim 2 wherein said oscillator is a voltage controlled oscillator (VCO).

6. The apparatus of claim 4 wherein said oscillator is a VCO.

7. The apparatus of claim 2 wherein said sampling output signal is an analog voltage signal.

8. The apparatus of claim 3 wherein said sampling output signal is an analog voltage signal.

9. The apparatus of claim 5 wherein said sampling output signal is an analog voltage signal and wherein said threshold signals are analog voltage signals and said comparator outputs signals are digital signals.

10. The apparatus of claim 6 wherein said frequency control means further comprises voltage control means responsive to the output of said comparator means for modulating the control voltage applied to the VCO and thereby controlling the frequency of the VCO output.

11. The apparatus of claim 1 wherein said camera is a CCD camera.

12. The apparatus of claim 9 wherein said frequency control means further comprises:

tuning means for tuning the frequency of the VCO output signals.

* * * * *